(12) United States Patent
Marks et al.

(10) Patent No.: US 10,891,244 B2
(45) Date of Patent: Jan. 12, 2021

(54) METHOD AND APPARATUS FOR REDUNDANT ARRAY OF INDEPENDENT DRIVES PARITY QUALITY OF SERVICE IMPROVEMENTS

(71) Applicant: DELL PRODUCTS, LP, Round Rock, TX (US)

(72) Inventors: Kevin T. Marks, Georgetown, TX (US); Chandrashekar Nelogal, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 120 days.

(21) Appl. No.: 16/171,350

(22) Filed: Oct. 25, 2018

(65) Prior Publication Data

US 2020/0133896 A1    Apr. 30, 2020

(51) Int. Cl.
| | |
|---|---|
| *G06F 13/16* | (2006.01) |
| *G06F 3/06* | (2006.01) |
| *G06F 13/24* | (2006.01) |
| *G06F 9/30* | (2018.01) |
| *G06F 13/42* | (2006.01) |

(52) U.S. Cl.
CPC ...... *G06F 13/1668* (2013.01); *G06F 9/30047* (2013.01); *G06F 13/24* (2013.01); *G06F 13/4221* (2013.01); *G06F 2213/0036* (2013.01)

(58) Field of Classification Search
None
See application file for complete search history.

(56) References Cited

U.S. PATENT DOCUMENTS

| | | | |
|---|---|---|---|
| 2013/0311822 A1 | 11/2013 | Kotzur et al. | |
| 2016/0313943 A1* | 10/2016 | Hashimoto | G06F 3/0659 |
| 2017/0329674 A1 | 11/2017 | Sreedhar et al. | |
| 2017/0351697 A1 | 12/2017 | Brosch | |
| 2017/0351731 A1 | 12/2017 | Brosch | |
| 2018/0136928 A1 | 5/2018 | Downum et al. | |
| 2018/0232277 A1 | 8/2018 | Nelogal et al. | |
| 2019/0369913 A1* | 12/2019 | Hahn | G06F 3/0619 |
| 2020/0097192 A1* | 3/2020 | de Kort | G06F 3/0637 |

* cited by examiner

*Primary Examiner* — Scott C Sun
(74) *Attorney, Agent, or Firm* — Larson Newman, LLP

(57) ABSTRACT

An information handling system includes a host configured to write a non-volatile memory express (NVMe) command on a memory submission queue slot. The NVMe command includes a pre-fetch command and a non-completion command. A controller uses the pre-fetch command to monitor read operations, and to place on hold an execution of the monitored read operations and an issuance of an interrupt in response to the non-completion command.

20 Claims, 6 Drawing Sheets

400

| Bit Entry 402 | Description 404 |
|---|---|
| Advisory Command Bit 406 | This field indicates an advisory command that includes a pre-fetch command or hint command that may be used to monitor potential read operations on the information handling system |
| Non-Completion Bit 408 | This field specifies a non-completion command that includes placing on hold notifications of the completion status, writing of completion entries, and generation or issuance of interrupts |
| ⋮ | |
| Other Bit 410 | Indicates range of logical block addresses for a pending read operation, etc. |

From Reserved Bits of DSM or SCSI CDB { Advisory Command Bit, Non-Completion Bit }

From Other Bits of DSM or SCSI CDB { Other Bit }

*FIG. 4*

METHOD AND APPARATUS FOR REDUNDANT ARRAY OF INDEPENDENT DRIVES PARITY QUALITY OF SERVICE IMPROVEMENTS

FIELD OF THE DISCLOSURE

This disclosure generally relates to information handling systems, and more particularly relates to a redundant array of independent drives (RAID) parity quality of service (QoS) improvements.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system includes a host configured to write a non-volatile memory express (NVMe) command on a memory submission queue slot. The NVMe command includes a pre-fetch command and a non-completion command. A controller uses the pre-fetch command to monitor read operations, and to place on hold an execution of the monitored read operations and an issuance of an interrupt in response to the non-completion command.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements.

Embodiments incorporating teachings of the present disclosure are shown and described with respect to the drawings presented herein, in which:

FIG. 4 is table showing a context attribute of a NVMe command, according to an embodiment of the present disclosure;

The use of the same reference symbols in different drawings indicates similar or identical items.

DETAILED DESCRIPTION OF DRAWINGS

Figure 1:
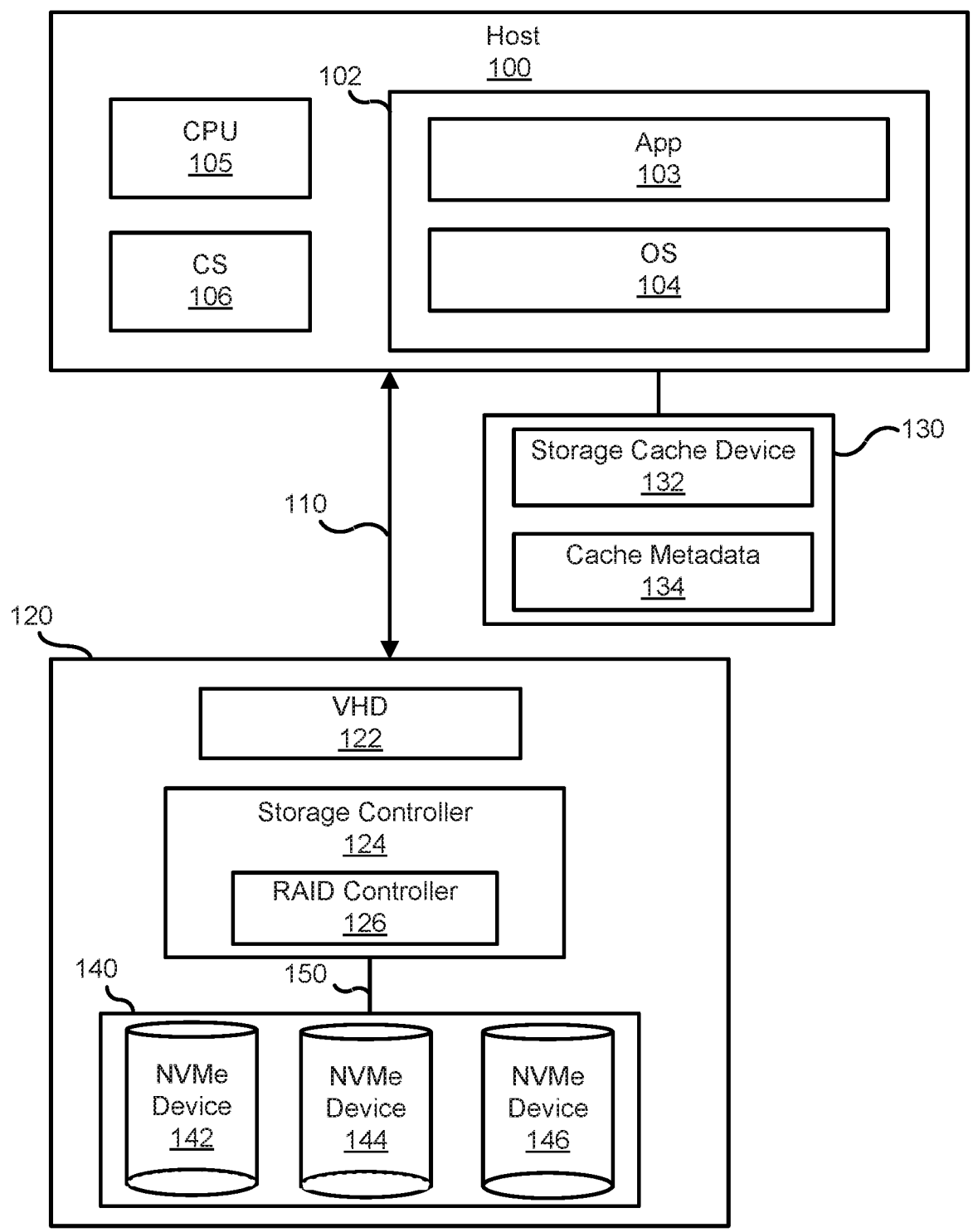
FIG. 1 is a block diagram of an information handling system configured to interface with non-volatile memory express (NVMe) devices, according to an embodiment of the present disclosure.

FIG. 1 illustrates an embodiment of a general information handling system configured as a host system 100. For purposes of this disclosure, the information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, the information handling system can be a personal computer, a laptop computer, a smart phone, a tablet device or other consumer electronic device, a network server, a network storage device, a switch router or other network communication device, or any other suitable device and may vary in size, shape, performance, functionality, and price. Furthermore, the information handling system can include processing resources for executing machine-executable code, such as a central processing unit (CPU), a programmable logic array (PLA), an embedded device such as a System-on-a-Chip (SoC), or other control logic hardware. Information handling system can also include one or more computer-readable medium for storing machine-executable code, such as software or data. Additional components of information handling system can include one or more storage devices that can store machine-executable code, one or more communications ports for communicating with external devices, and various input and output (I/O) devices, such as a keyboard, a mouse, and a video display. Information handling system can also include one or more buses operable to transmit information between the various hardware components.

In an embodiment, the host 100 includes a system memory 102 that further includes an application program 103 executing within an operating system (OS) 104. The host 100 includes one or more CPUs 105 that are coupled to the system memory 102 in which the application program 103 and the operating system 104 have been stored for execution by the CPU(s). A chip set 106 may further provide one or more input/output (I/O) interfaces to couple external devices to the host 100.

The host 100 may generate I/O transactions 110 targeting a coupled storage subsystem 120 that includes a virtual hard drive (VHD) 122. The host 100 further employs a storage cache device 130 that is configured to cache the I/O transactions 110. The storage cache device 130 is analogous to an L1 data cache employed by the CPU. The storage cache device 130 includes one or more cache storage devices 132 and cache metadata 134 that is maintained by a storage cache module in OS 104. The host 100 enables and supports the storage cache device 130 with the storage cache module in the OS 104.

At the storage subsystem 120, a storage controller 124 may map the VHD 122 to a RAID array 140. In an embodiment, the storage controller 124 includes a RAID controller 126 that may be configured to control multiple non-volatile memory express (NVMe) devices 142-146 that make up the RAID array 140. The number of NVMe devices presented is for ease of illustration and different numbers of NVMe devices may be utilized in the RAID array 140. The NVMe devices may be independent solid state data storage drives (SSD) that may be accessed through a peripheral component interconnect express (PCIe) bus 150.

In an embodiment, the host 100 is configured to write an NVMe command. In this embodiment, the NVMe command is directed to the storage controller 124 and the RAID array 140. The NVMe command, for example, may include features to reduce latency and to improve the QoS performance of the information handling system. The NVMe command may further include other commands such as read or write operations to be performed on the RAID array 140.

Figure 2:
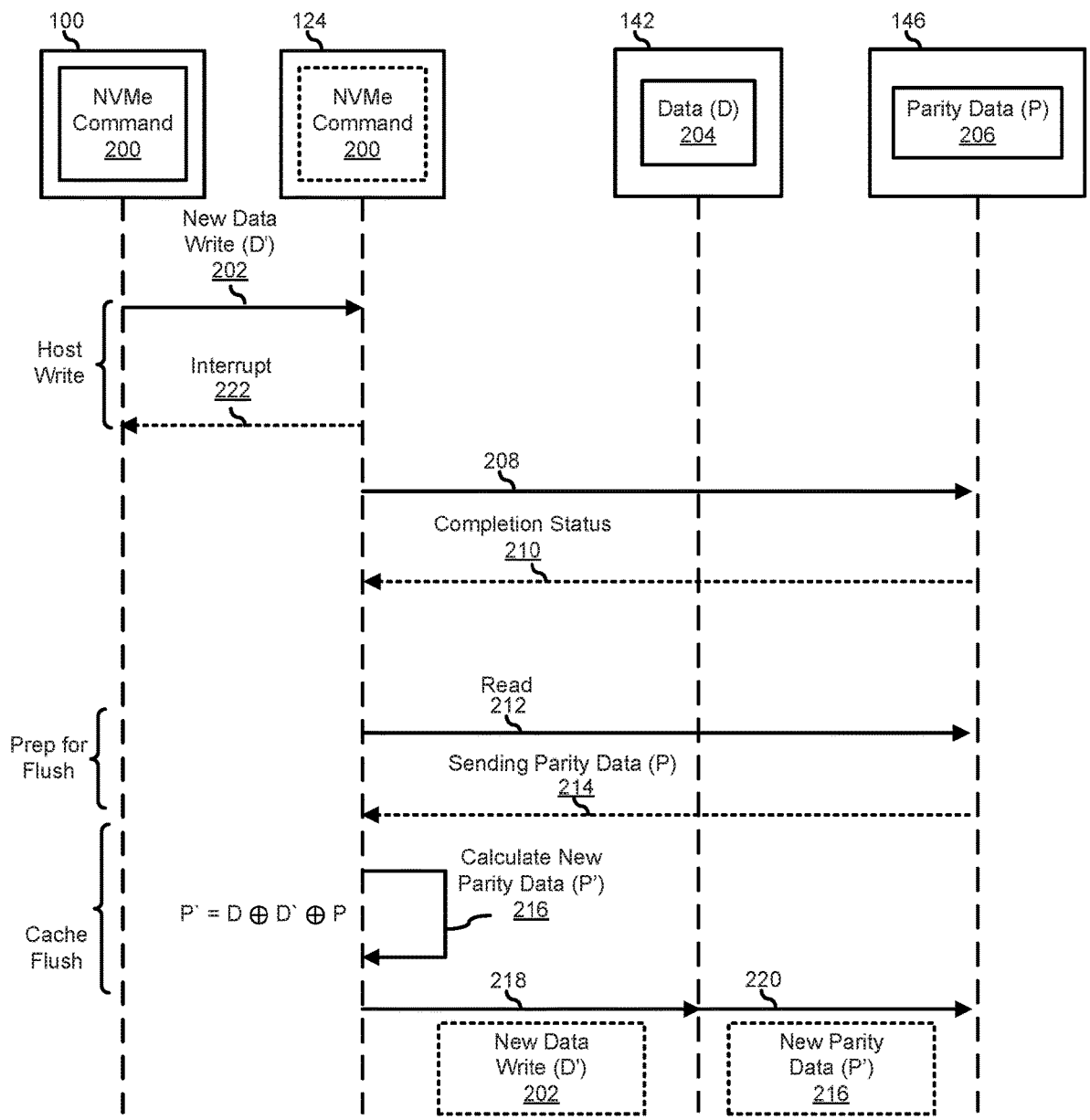
FIG. 2 is a sequence diagram of a method for implementing an NVMe command to improve QoS performance in the information handling system, according to an embodiment of the present disclosure.

FIG. 2 shows a read-modify-write process of a RAID parity calculation for the RAID array. The RAID parity calculation may be performed, for example, in case new data is to be written in a data drive and parity data on a parity drive needs to be recalculated. In another example, the RAID parity calculation is performed when a command from the host calls for the parity data calculation in the parity drive. In these examples, an application of the features of the NVMe command may reduce latency during the RAID parity calculations, and particularly during a preparation for a flushing stage in the read-modify-write process. The reduction of latency in the read-modify-write process may be extended to other methods of RAID parity calculation such as the read-peers method that includes reading of different data drives to recalculate the parity data.

As an overview of the read-modify-write process, the host 100 sends a write command that includes a new data write (D') that replaces the value of data (D) in the data drive. An XOR operation is then performed on the new data write (D'), the value of data (D), and parity data (P) from the parity drive to obtain new parity data (P'). Thereafter, the new data write (D') and the new parity data (P') are written on the data drive and parity drive, respectively. By using the features of the NVMe command, latency overhead in staging of data in the storage controller's dynamic random access memory (DRAM), reading of the parity data, and the calculation of the new parity data (P') to commit writes are minimized.

In an embodiment, the NVMe command 200 includes a request to write the new data, which is represented by a new data write (D') 202. For example, the new data write (D') 202 is used to overwrite the value of data (D') 204 in the NVMe device 142 of the RAID array 140. As a consequence, the parity data (P) 206 in the NVMe device 146 needs to be recalculated and re-written to the parity drive. In this embodiment, the data (D') 204 and the parity data (P) 206 may belong to the same RAID stripe. Furthermore, for this RAID stripe, the NVMe device 142 is configured to store data while the NVMe device 146 is configured to store the parity data.

In an embodiment, the NVMe command 200 further includes an advisory command and a non-completion command. In this embodiment, the advisory command may be represented by a pre-fetch command, a hint command, or other new instruction or command that gives an advance notification or information of pending I/O transactions. The non-completion command may include a directive not to perform a command completion, not to issue a completion status or interrupt, or not to issue any form of acknowledgement until the command has been issued and completed, or when requested to do so by the host 100. In an embodiment, the completion status may be posted but the interrupt is not generated in response to the non-completion command.

With the received NVMe command from the host 100, the storage controller 124 is configured to send 208 the advisory and non-completion command features of the NVMe command 200 to the NVMe device 146. For example, the advisory command includes a pending read operation on a certain range of logical block addresses in the NVMe device 146 for purposes of RAID parity calculation to obtain the new parity data (P'). In this example, the advisory command is received and used by the NVMe device 146 as a basis for expecting and monitoring potential read operation on the certain range of logical block addresses.

In an embodiment, the NVMe device 146 may place on hold a sending 210 of a completion status. In this embodiment, the NVMe device 146 will not send the completion status 210 until the command has been issued, or the NVMe device is required by the host or storage controller to send the completion status. For example, the NVMe device 146 will not send the completion status 210 until the read command for the certain range of logical block addresses has been issued by the storage controller 124. In another example, the NVMe device 146 will not send the completion status 210 unless it is required to do so by the storage controller or the host. In a case where the completion status 210 was posted due to issuance of the command or upon the request by the storage controller or host, the interrupt is not issued in response to the non-completion command. In an embodiment, the sending of the completion status after completion of the command may be required to make sure that notification for the command completion is not lost. In alternative embodiment, once the NVMe device 146 moves the SQ tail pointer to pass a location of the no-complete command, the storage controller may inform the host that the command is complete, so no delayed completion or interrupt.

Upon issuance of the read command 212 by the storage controller 124 during the preparation for flushing stage, the NVMe device 146 may send and cache 214 the data within the range of logical block addresses to the storage controller 124 for the calculation of the new parity data (P'). The new parity data (P') 216 may be calculated by performing the XOR operation on the values of the data (D') 204, new data write (D') 202 and the parity data (P) 206. This XOR operation is represented by an equation P'=D⊕D'⊕P where "⊕" denotes the XOR operation. Thereafter, the new data write (D') 202 and new parity data (P') 216 are written 218 and 220 in the NVMe devices 142 and 146, respectively. In another embodiment such as the read-peers method, the new parity data (P') 216 is calculated by performing the XOR operation on the value of the new data write (D') 202 and data of the NVMe device 144 in the same RAID stripe. In the read-peers method, the read operations are performed in the NVMe devices that store data and not on the NVMe device that stores the parity data.

After the cache flushing stage that includes the completion of the write command, the storage controller 124 may send 222 an interrupt to the host 100.

Since the write operation depends on the reads, any latency in the reads would contribute to the latency in the write. Even in the case of write-back configurations, the cache flush operation depends on the latency of the reads. As described, the use of advisory and non-completion features of the NVMe command 200 facilitates optimization of a parity calculation path and the leveraging of the pre-fetch capabilities of the NVMe drives. In case of servicing multiple writes, the storage controller may coalesce flush operation so that it will be able to issue limited pre-fetch requests to the NVMe drives considering all the outstanding writes.

In an embodiment, when the advisory and non-completion command 208 uses the pre-fetch command, the pre-fetch command may be represented by a 'read prepare' bit or other flag that is added to context attributes of the Dataset Management command. In this embodiment, the additional bit flag may be taken or derived from one of the reserved bits of the Dataset Management command. For example, NVMe standard specifies the reserved bits on a "Dataset Management—Command Dword 11" that is used in the Dataset Management command. In this example, the bit flag may be taken from the reserved bits of the "Dataset Management—Command Dword 11" and used as the pre-fetch command. The Dataset Management command may be used by the host to indicate attributes for ranges of logical blocks. The attributes include frequency that data is read or written, access size, and other information that may be used to optimize performance and reliability.

In another embodiment, the pre-fetch command may be represented by the 'read prepare' bit or other flag that is added to context attributes of a small computer system interface (SCSI) command—PREFETCH. In this other embodiment, one of the reserved bits in SCSI command descriptor block (CDB) may be used as the 'read prepare' flag or additional bit flag. For the SCSI command—PREFETCH and the Dataset Management command, the applicability of the pre-fetch command may be applied to each range of logical block addresses.

The pre-fetch command is further configured to specify the non-completion command feature of the NVMe command. In an embodiment, the specified non-completion command may utilize another bit flag on the reserve bits of the Dataset Management command or the SCSI CDB. For example, the non-completion command is taken from another reserved bit of the "Dataset Management—Command Dword 11" for the Dataset Management command. In this embodiment, the added bit flag serves as a directive not to perform a command completion, to make the command execution optional, not to issue a completion status or interrupt, or not to issue any form of acknowledgement until the command has been issued and completed, or when requested to do so by the host 100

In an embodiment, when the advisory command is represented by the hint command or other instruction, the advisory and non-completion command 208 may be issued as a brand new command. In other words, the bit flag that represents the hint command or other instruction is derived from a new set of issued commands. The new set of issued commands is not represented nor derived from the reserved bits of the Dataset Management command or the SCSI CDB above. In this embodiment, the non-completion command may be issued separately by the host 100 from the hint command or other instruction. That is, the non-completion command may include a separate bit flag that serves as a directive not to perform a command completion or make the command execution optional, not to issue a completion status or interrupt, or not to issue any form of acknowledgement until the command has been issued and completed, or when requested to do so by the host 100.

In a preferred embodiment, the RAID array 140 in the read-modify-write process above is implemented using RAID 5. For example, on a first iteration that includes the writing of the new data write (D) 202 on a first RAID stripe, the NVMe device 146 is configured as the parity drive while the NVMe devices 142 and 144 may be configured to store data. However, at a next iteration that uses a different RAID stripe, the NVMe device 144 may be configured to store the parity data while the NVMe devices 142 and 146 are configured to store data. In other embodiments, the read-peers method is used. In these embodiments, the RAID array 140 may be implemented using other types of RAID levels such as RAID 6 that would result in the data (D) 204 and the parity data (P) 206 being written to different drives.

Accordingly, the advisory and non-completion command features of the NVMe command may improve the QoS performance in the information handling system by leveraging the pre-fetch capabilities of the NVMe drives in the RAID array.

Figure 3:
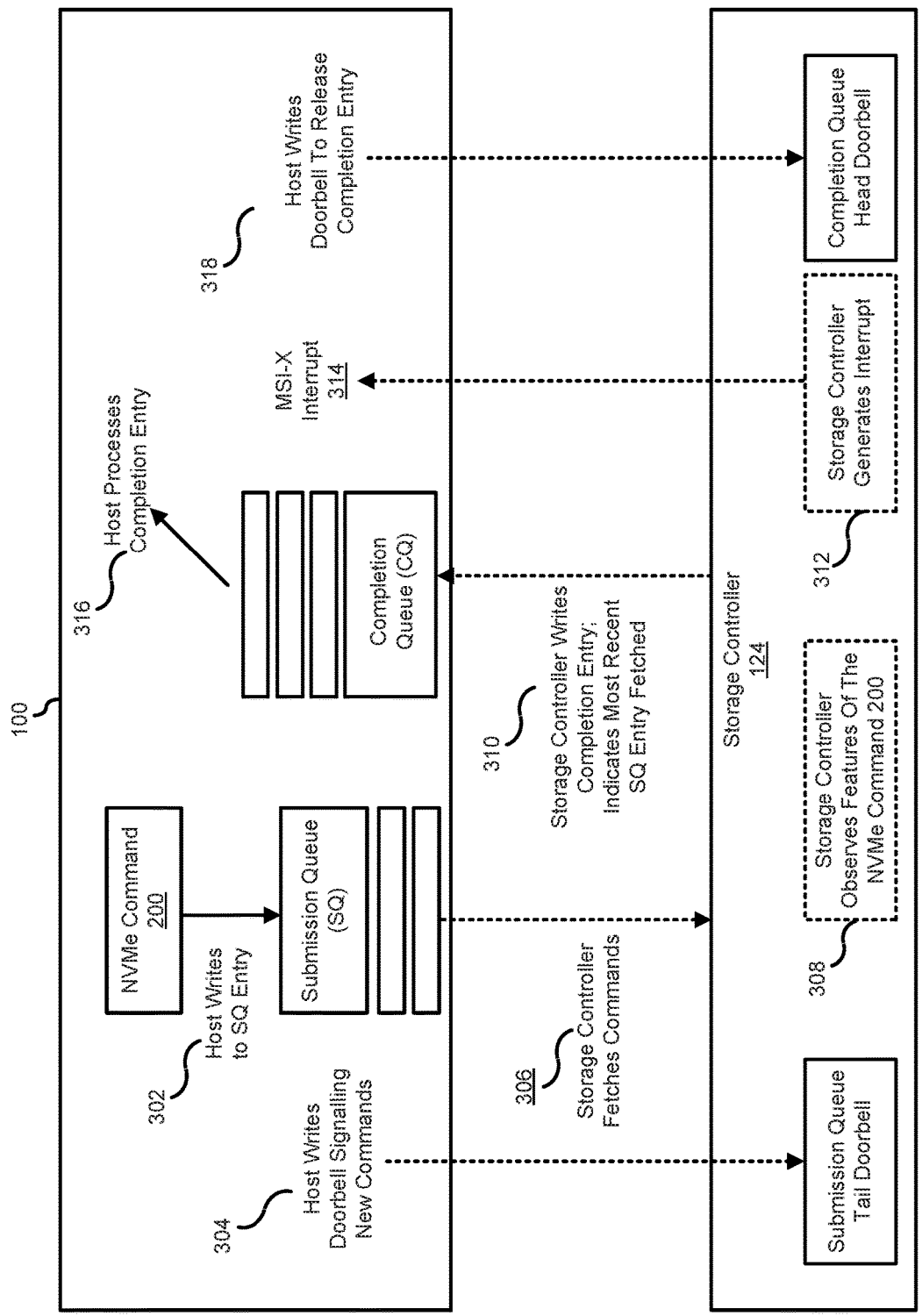
FIG. 3 is a sequence diagram of a method for implementing the NVMe command in between the host and the storage controller, according to an embodiment of the present disclosure.

FIG. 3 shows NVMe command submission and completion mechanism in between the host 100 and the storage controller 124. The NVMe command, for example, is represented by the NVMe command 200 that includes features to reduce latency and improve the QoS performance in the host 100 and the storage controller 124.

In an embodiment, the NVMe command includes the advisory command and the non-completion command. In this embodiment, the advisory command may give advance notification or information to the storage controller 124 of pending I/O transactions. For example, the pending I/O transactions include the read operation on a certain range of logical block addresses in the RAID array 140 during the RAID parity calculation. In this example, the advisory command is received and used by the storage controller 124 as a basis for expecting and monitoring the potential read operation on the certain range of logical block addresses in the RAID array 140.

The non-completion command may include a directive to the storage controller 124 not to perform a command completion or at least not to issue an interrupt message until the command has been issued and completed, or until requested to do so by the host 100. For example, for the monitored potential read operation on the certain range of logical block addresses, the storage controller 124 does not perform read operation on the certain range of logical block addresses until the read command has been issued to the RAID array. In a case where the read operation has been performed or completed by the storage controller 124 on the RAID array 140, the storage controller 124 does not issue the interrupt message to the host 100 in response to the non-completion command.

In an embodiment, when the advisory command is represented by the pre-fetch command, the non-completion command may be represented by additional bit flag in the context attributes of the Dataset Management command or SCSI CDB. In this embodiment, the storage controller 124 receives and uses the pre-fetch command as a basis for monitoring potential operation. Similarly, the storage controller 124 uses the additional bit flag as an instruction for non-completion of the command or at least not to issue the interrupt message to the host 100 in a case where the command has been completed or performed.

When the NVMe command uses the hint command or other instruction as the advisory command, the hint command or other instruction may be issued as a new command by the host 100. For example, the new command is represented by a first new bit. In this example, the non-completion command may be represented by a separate second new bit. The storage controller 124 may use the first new bit as a basis for monitoring potential I/O operations while the second new bit is used by the storage controller 124 as a basis for the non-completion of the command or non-issuance of interrupt. These advisory and non-completion command features of the NVMe command are further described below with respect to the sequence diagram for implementing the NVMe command 200 in between the host 100 and the storage controller 124.

At step 302, the host 100 writes the NVMe command 200 at a next free memory submission queue slot. The submission queue slot is a circular buffer with a fixed slot size that the host software uses to submit NVMe commands for execution by the storage controller 124. When the host 100 places or builds the NVMe command 200 for the storage controller to execute, the host 100 is configured to first check that appropriate submission queue slots are not full. For example, the submission queue slots are full when the number of entries in the submission queue is one less than a queue size.

At step 304, the host 100 updates a submission queue tail doorbell register at the storage controller 124 with a new value of the submission queue tail entry pointer. This new value of the submission queue tail entry pointer may indicate to the storage controller 124 that new commands were submitted for processing. For example, the new commands include the NVMe command 200. In this example, the NVMe command 200 includes at least the advisory command and the non-completion command.

At step 306, the storage controller 124 may transfer the NVMe command 200 from the submission queue slots into the storage controller 124. At step 308, the storage controller 124 observes or utilizes the received advisory and non-completion command features of the NVMe command 200 with regard to execution or completion of placed commands and non-issuance of interrupt messages to the host 100.

For example, the advisory command of the NVMe command 200 includes a pending read operation on a certain range of logical block addresses of the RAID array 140. In response to the advisory command, the storage controller 124 monitors the pending read operation. Furthermore, the storage controller 124 may not proceed with the read operation on the range of logical block addresses on the RAID array 140 in response to the non-completion command. In a case where the storage controller 124 has issued and completed the read operation on the RAID array 140, the storage controller 124 does not issue the interrupt to the host 100.

After the command has been issued and completed by the storage controller 124, the storage controller, at step 310, places a completion queue entry in the next free slot in the associated completion queue. As part of the completion queue entry, the storage controller 124 may indicate the most recent submission queue entry that has been consumed by advancing the submission queue head pointer in the completion entry. Each new completion queue entry has a phase tag inverted from the previous entry to indicate to the host 100 that this completion queue entry is a new entry.

In an embodiment, and in response to the non-completion command feature of the NVMe command 200, the storage controller 124 may hold the placing of the completion queue entry even though the command has been issued and completed. In this embodiment, the completion queue entry is placed when required to do so by the host 100.

In other embodiments, the writing of the completion entry is required on the storage controller. In this case, the storage controller may place on hold notifications for the completion entry by not issuing the interrupt.

At step 312, the storage controller 124 generates an interrupt to the host 100 to indicate that there is a new completion queue entry to consume and to process. The interrupt is indicated by an extended message signaled interrupt (MSI-X) 314, which is similar to the interrupt 222. In an embodiment, the storage controller 124 generates the MSI-X 314 when the command has been issued, completed, or the host 100 requests the issuance of the interrupt.

At step 316, the host 100 consumes and processes the new completion queue entries in the completion queue. The consummation and processing includes taking any actions based on error conditions that may be indicated. The host 100 continues consuming and processing completion queue entries until it encounters a previously consumed entry with a phase tag inverted from the value of the current completion queue entries.

At step 318, the host 100 writes the completion queue head doorbell register to indicate that the completion queue entry has been consumed. The host 100 may consume many entries before updating the associated completion queue head doorbell register on the storage controller 124. The consumed entries may include the read operations on the RAID array 140.

Accordingly, the latency is reduced and the QoS performance is improved through the observance of the advisory and non-completion command features of the NVMe command in between the host and the storage controller.

FIG. 4 shows an example NVMe command field 400 that describes the context attributes of the NVMe command. The NVMe command field 400 may include multiple fields; however, for ease of illustration, at least the bit allocations and associated bit descriptions of the NVMe command are presented. For example, a bit entry 402 of the NVMe command field 400 includes a bit entry for a particular operation code while a description 404 includes a description of the context attribute as represented by the bit entry 402.

FIG. 4 further shows an advisory command bit 406 that represents the advisory command feature of the NVMe command, a non-completion bit 408 that represents the specified non-completion command feature of the NVMe command, and an other bit 410 that represents the other bit entries in the NVMe command.

In an embodiment, the advisory command bit 406 and the non-completion bit 408 are added context attributes of the Dataset Management command or SCSI command—PREFETCH. In this embodiment, advisory command and non-completion command bits are taken from the reserved bits of Dataset Management command or SCSI CDB. In another embodiment, the NVMe command field includes new commands that represent a hint command or instruction. In this other embodiment, the advisory command and non-completion command bits are issued as new commands by the host.

In an embodiment, the advisory command bit 406 may indicate the advisory command feature of the NVMe command. In this embodiment, the advisory command bit 406 may be used as a basis for monitoring potential read operations on the information handling system. For example, the advisory command bit 406 is added to context attributes of the Dataset Management command or SCSI command—PREFETCH. In another example, the advisory command is a new hint command or new instruction. In both examples, the advisory command bit 406 may supply the advance notification or information of pending I/O operations. The advance notification may indicate attributes such as frequency of reading or writing data, access size or range of the logical block addresses to be read, NVMe command execution timing, and other information that may be used to monitor potential read operations on the information handling system.

In an embodiment, the non-completion bit 408 may represent the no-interrupt or non-completion command of the NVMe command. For example, when the advisory command bit 406 is represented by a first reserved bit from the Dataset Management command or SCSI CDB, then the non-completion bit 408 may be represented by a second reserved bit from the Dataset Management command or SCSI CDB. In a case where the advisory command bit 406 represents a brand new hint command or a brand new instruction, the non-completion bit 408 may be configured as a brand new command that represents the non-completion feature of the NVMe command 200. In this case, the non-completion bit 408 is separate and independent from the new hint command or instruction.

In an embodiment, the other bit 410 may represent one of many fields that may be configured on the NVMe command fields 400. For example, the other bit 410 may includes range of logical block addresses of the pending read operations. In another example, the other bit 410 may represent a pending write operation, etc. In these examples, the other bit 410 may include a command field in the Dataset Management command or SCSI command—PREFETCH.

Figure 5:
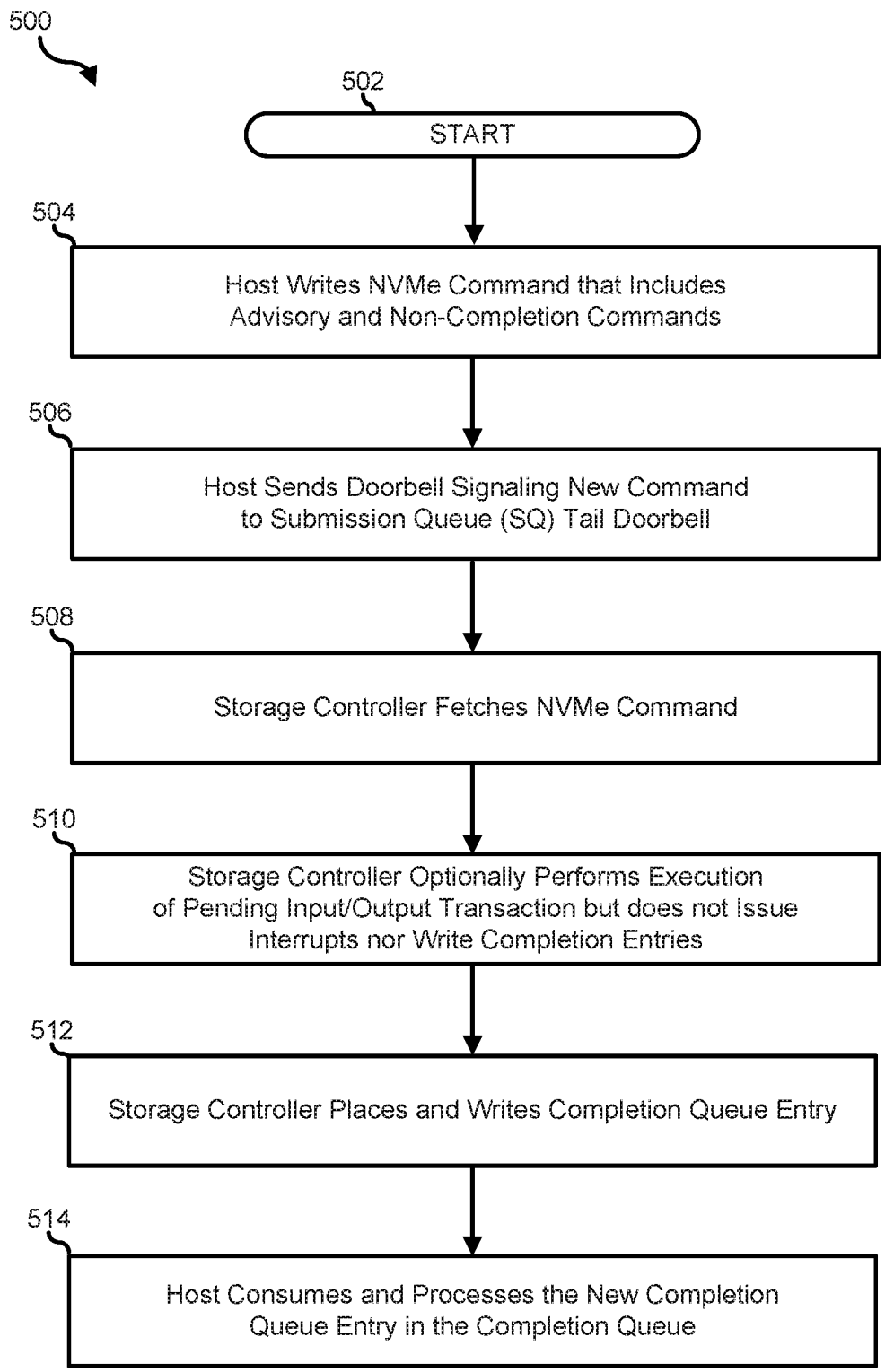
FIG. 5 is a flow chart showing a method of QoS performance optimization during an input/output (I/O) operation, according to an embodiment of the present disclosure.

FIG. 5 shows a method 500 of improving QoS performance during the I/O transaction operation on the information handling device, starting at block 502. At block 504, the host 100 writes the NVMe command 200. The NVMe command 200 includes the advisory and non-completion commands that are directed to the storage controller 124 and the RAID array 140. At block 506, the host 100 sends a doorbell signaling new commands to submission queue tail doorbell. In response to the writing of the doorbell signaling new commands, the storage controller 124 fetches the NVMe commands at block 508. At block 510, and in response to the advisory command, the storage controller 124 may place on hold the execution of pending I/O transactions such as the read operation. Furthermore, the storage controller 124 does not issue interrupts in response to the non-completion command feature of the NVMe command 200. The placing on hold of the execution and non-issuance of the interrupts are similarly implemented at the RAID array 140.

After the command has been issued and completed by the storage controller 124, the storage controller 124, at block 512, writes completion queue entries and generates corresponding interrupts such as the MSI-X interrupt 314. At block 514, the host 100 consumes and processes the completion queue entries in the completion queue.

Figure 6:
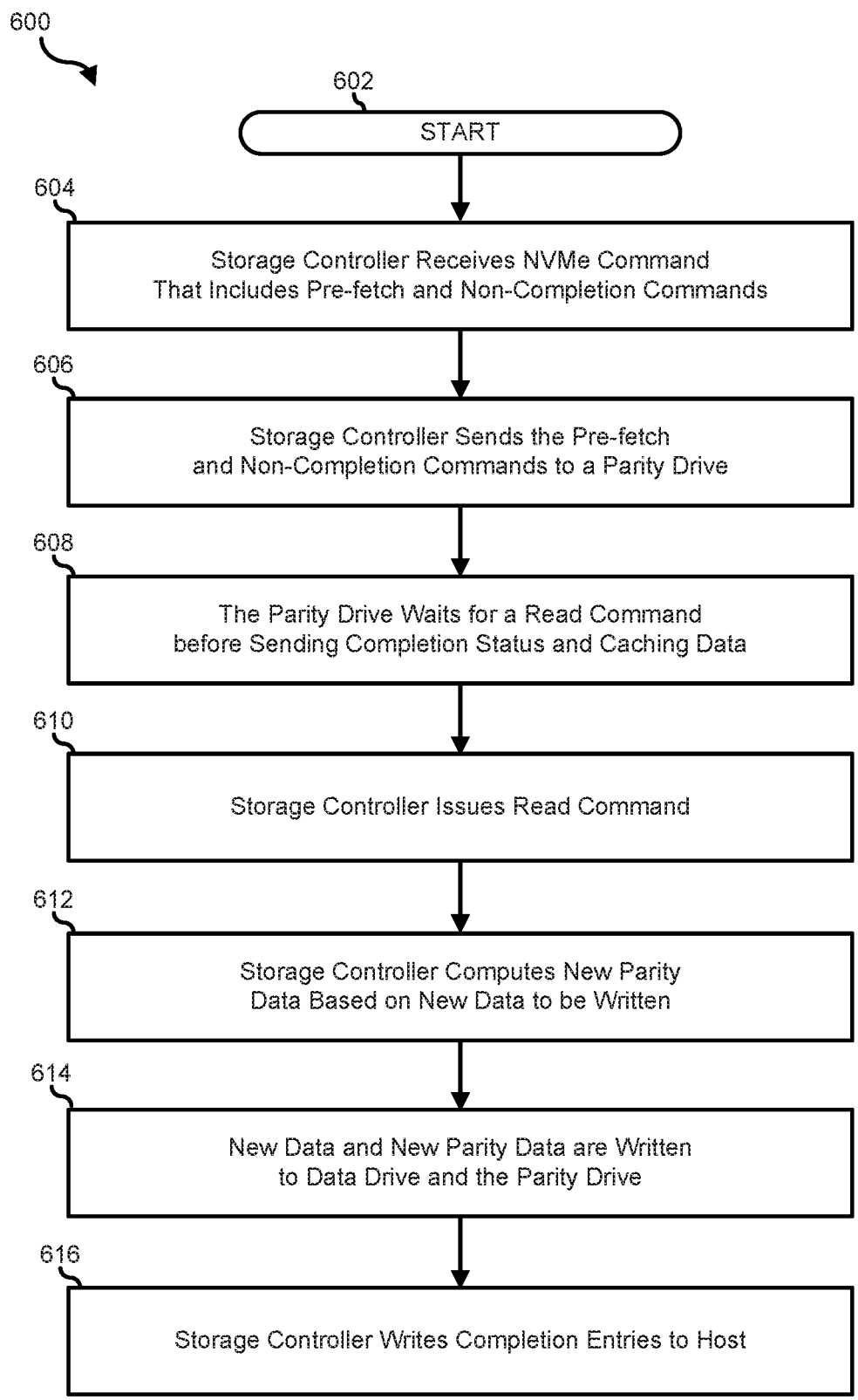
FIG. 6 is a flow chart showing a method of RAID parity calculation using the NVMe command in a read-modify-write process, according to an embodiment of the present disclosure.

FIG. 6 shows a method 600 of implementing the NVMe command in the RAID array, starting at block 602. At block 604, the storage controller 124 receives the NVMe command 200. In an embodiment, The NVMe command 200 includes the pre-fetch and non-completion commands. At block 606, the storage controller 124 sends to a parity drive the pre-fetch and non-completion commands. In response, at block 608, the parity drive waits for a read command from the storage controller before sending completion status and caching data for a read operation. At block 610, the storage controller 124 issues the read command and the parity drive will then send the data within a range of logical block addresses. At block 612, the storage controller 124 computes for a new parity data based on new data to be written to the data drive. At block 614, the new data and the calculated new parity data are written to the data drive and parity drive, respectively. At block 616, the storage controller 124 may write completion entries to the host.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
a host configured to write a non-volatile memory express command that includes an advisory command and a non-completion command; and
a controller coupled to the host, wherein the controller is adapted to utilize the advisory command to monitor read operations, and to place on hold an execution of the monitored read operations and an issuance of an interrupt in response to the non-completion command.

2. The information handling system of claim 1, wherein the advisory command is implemented by a pre-fetch command that is added to a context attribute of a Dataset Management command.

3. The information handling system of claim 2, wherein the pre-fetch command includes a bit flag that is taken from reserved bits of the Dataset Management command.

4. The information handling system of claim 1, wherein the advisory command is implemented by a pre-fetch command that is added to a context attribute of a small computer system interface command—PREFETCH.

5. The information handling system of claim 4, wherein the pre-fetch command includes a bit flag that is derived from reserved bits of a small computer system interface command descriptor block.

6. The information handling system of claim 1, wherein the advisory command is implemented by a hint command.

7. The information handling system of claim 6, wherein the non-completion command is a new command that is independent from the hint command.

8. The information handling system of claim 1, wherein the non-completion command places on hold a writing of a completion queue entry by the controller.

9. The information handling system of claim 1, further comprising a redundant array of independent disks (RAID) array coupled to the controller, wherein the controller implements the advisory command and non-completion command to the RAID array.

10. A method, comprising:
  writing, by a host, of a non-volatile memory express command that includes an advisory command and a non-completion command;
  using, by a controller, of the advisory command to monitor read operations and in response to the non-completion command, the controller places on hold:
  an execution of the monitored read operations; and
  issuance of an interrupt.

11. The method of claim 10, wherein the advisory command is represented by a pre-fetch command that is added to a context attribute of a Dataset Management command.

12. The method of claim 11, wherein the pre-fetch command is represented by a bit flag that is derived from reserved bits of Dataset Management command.

13. The method of claim 10, wherein the non-completion command is represented by a bit flag that is derived from reserved bits of Dataset Management command.

14. The method of claim 10, wherein the advisory command is implemented by a hint command.

15. The method of claim 14, wherein the non-completion command is a new command that is independent and separate from the hint command.

16. The method of claim 15, wherein the hint command includes advance notifications of an input/output transaction.

17. An information handling system, comprising:
  a host configured to write a non-volatile memory express (NVMe) command on a memory submission queue slot, wherein the NVMe command includes a pre-fetch command and a non-completion command;
  a controller coupled to the host, wherein the controller is adapted to utilize the pre-fetch command to monitor read operations, and to place on hold an execution of the monitored read operations and an issuance of an interrupt in response to the non-completion command.

18. The information handling system of claim 17, wherein the pre-fetch command is an added context attribute of a Dataset Management command.

19. The information handling system of claim 18, wherein the pre-fetch command includes a bit flag that is derived from reserved bits of the Dataset Management command.

20. The information handling system of claim 17, wherein the non-completion command includes a bit flag that is derived from reserved bits of the Dataset Management command.

\* \* \* \* \*